(12) United States Patent
Gantie et al.

(10) Patent No.: US 8,167,232 B2
(45) Date of Patent: May 1, 2012

(54) DEVICE THAT MAKES IT POSSIBLE TO IMPROVE THE EFFECTIVENESS OF THE ACOUSTIC TREATMENTS IN A PIPE OF AN AIRCRAFT POWER PLANT

(75) Inventors: Fabrice Gantie, Toulouse (FR); Yann Druon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 376 days.

(21) Appl. No.: 12/440,354

(22) PCT Filed: Sep. 6, 2007

(86) PCT No.: PCT/FR2007/051880
§ 371 (c)(1),
(2), (4) Date: Mar. 6, 2009

(87) PCT Pub. No.: WO2008/029062
PCT Pub. Date: Mar. 13, 2008

(65) Prior Publication Data
US 2010/0038476 A1 Feb. 18, 2010

(30) Foreign Application Priority Data
Sep. 7, 2006 (FR) .................................... 06 53606

(51) Int. Cl.
*B64C 1/40* (2006.01)
(52) U.S. Cl. ............................ 244/1 N; 60/725; 181/210
(58) Field of Classification Search .................. 244/1 N; 60/725; 181/178, 214, 210
See application file for complete search history.

(56) References Cited

U.S. PATENT DOCUMENTS

| | | | | | |
|---|---|---|---|---|---|
| 2,759,554 | A | * | 8/1956 | Baruch ......................... | 181/295 |
| 2,916,101 | A | * | 12/1959 | Naman ......................... | 181/224 |
| 2,918,984 | A | * | 12/1959 | Lemmerman ................. | 181/256 |
| 2,990,906 | A | * | 7/1961 | Audette ....................... | 181/256 |

(Continued)

FOREIGN PATENT DOCUMENTS

GB 1 284 341 8/1972

(Continued)

OTHER PUBLICATIONS

Dunn, M.H. Farassat, F., Liner Optimizatioin Studies Using the Ducted Fan Noise Prediction Code TBIEM3D, 1998, American Institute of Aeronautics and Astronautics AIAA, 4TH Aeroacoustics Conference, Toulouse France.*

(Continued)

*Primary Examiner* — Benjamin P Lee
(74) *Attorney, Agent, or Firm* — Young & Thompson

(57) ABSTRACT

A device for improving the effectiveness of the acoustic treatment(s) in an aircraft propulsion unit that includes a pipe (36) into which a gas stream flows, whereby the pipe (36) is delimited by two approximately concentric inside walls (40) and outside walls (42), wherein the device includes at least one partition (38, 38') that extends over at least one portion of the length of the pipe (36) between the inside and outside walls (40, 42) and in that the profile of at least one wall (44, 46) of the at least one partition (38, 38') is defined so as to increase the number of reflections of an acoustic beam on at least one of the inside and/or outside walls (40, 42) of the pipe and/or on at least one of the walls (44, 46) of the at least one partition (38, 38').

8 Claims, 2 Drawing Sheets

U.S. PATENT DOCUMENTS

| | | | | |
|---|---|---|---|---|
| 3,002,341 | A * | 10/1961 | Muzzy et al. | 239/265.17 |
| 3,477,231 | A * | 11/1969 | Paulson | 60/269 |
| 3,489,377 | A * | 1/1970 | Wright et al. | 219/85.15 |
| 3,533,486 | A * | 10/1970 | Paulson | 181/214 |
| 3,574,477 | A * | 4/1971 | Dolf et al. | 415/60 |
| 3,617,147 | A * | 11/1971 | Bragg | 415/195 |
| 3,692,141 | A | 9/1972 | Labussiere et al. | |
| 3,745,629 | A * | 7/1973 | Pask et al. | 29/889.22 |
| 3,890,060 | A | 6/1975 | Lipstein | |
| 4,023,644 | A * | 5/1977 | Cowan et al. | 181/222 |
| 4,131,387 | A * | 12/1978 | Kazin et al. | 415/119 |
| 4,137,992 | A * | 2/1979 | Herman | 181/213 |
| 4,335,801 | A * | 6/1982 | Stachowiak et al. | 181/213 |
| 4,723,626 | A * | 2/1988 | Carr et al. | 181/213 |
| 4,817,756 | A * | 4/1989 | Carr et al. | 181/214 |
| 5,224,341 | A | 7/1993 | Munroe et al. | |
| 5,603,471 | A * | 2/1997 | Armstrong | 244/53 R |
| 5,709,529 | A * | 1/1998 | Parzych | 415/119 |
| 5,848,526 | A * | 12/1998 | Hanson | 60/226.1 |
| 5,952,621 | A * | 9/1999 | Curtis et al. | 181/213 |
| 7,083,144 | B2 * | 8/2006 | Howe et al. | 244/54 |
| 7,248,704 | B2 * | 7/2007 | Carme et al. | 381/71.5 |
| 7,552,796 | B2 * | 6/2009 | Baarck et al. | 181/250 |
| 7,654,363 | B2 * | 2/2010 | Crosta et al. | 181/213 |
| 7,850,116 | B2 * | 12/2010 | Stuhr | 244/54 |
| 2005/0284690 | A1 * | 12/2005 | Proscia et al. | 181/214 |

FOREIGN PATENT DOCUMENTS

| | | | |
|---|---|---|---|
| GB | 2217951 | A * | 11/1989 |
| WO | 95/18042 | | 7/1995 |

OTHER PUBLICATIONS

International Search Report dated Mar. 6, 2008, from corresponding PCT application.

* cited by examiner

DEVICE THAT MAKES IT POSSIBLE TO IMPROVE THE EFFECTIVENESS OF THE ACOUSTIC TREATMENTS IN A PIPE OF AN AIRCRAFT POWER PLANT

This invention relates to a device that makes it possible to improve the effectiveness of acoustic treatments in a pipe of an aircraft power plant.

Figure 1:
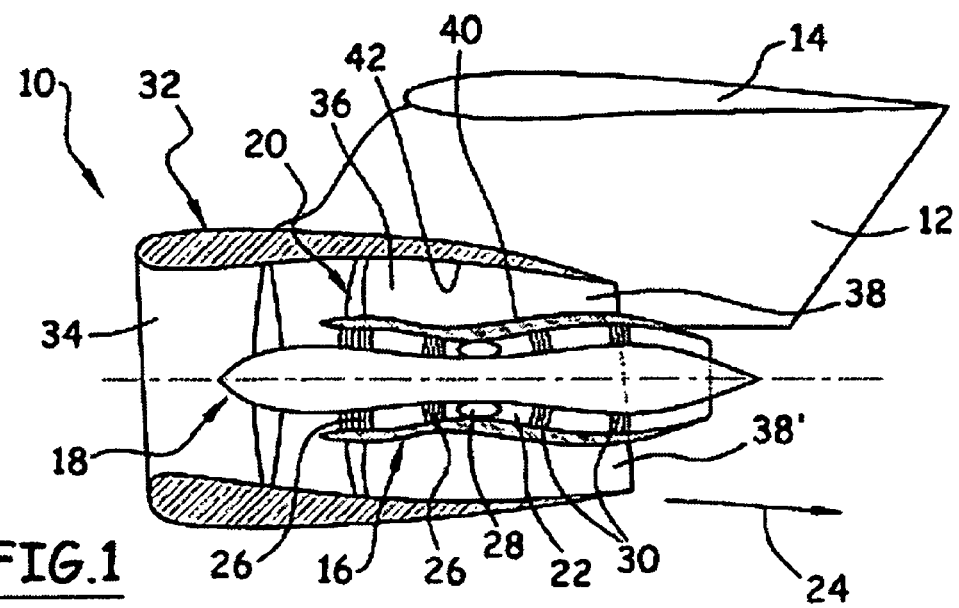

In FIG. 1, an aircraft propulsion unit, also called a turbojet, connected to an aircraft using connecting means, in particular using a mast 12 under the wing 14, is shown at 10. It comprises an engine 16 with, on the one hand, a fan that comprises a rotor 18 that is equipped with blades and a stator 20 that is equipped with paddles, and, on the other hand, a primary pipe 22 in which compressor stages 26, a combustion chamber 28 and turbine stages 30 are arranged in the direction of flow of the air 24. The engine 16 is arranged in a nacelle 32 that comprises an air intake 34 that is upstream from the fan and a secondary pipe 36 that is downstream from the stator of the fan.

At least one crosspiece 38 that is also called a junction generally connects the engine and the nacelle, extending between the inside wall 40 and the outside wall 42 of the secondary pipe, whereby said crosspiece forms a partition in the secondary pipe 36 that is arranged in the direction of the air flow 24 and a radial direction.

According to one embodiment, the power plant comprises two radial crosspieces 38 and 38', arranged in a vertical plane, at angular positions that are respectively greater than 12 o'clock and less than 6 o'clock, whereby said crosspieces form two junctions, splitting the secondary pipe 36 into two parallel pipes in the shape of a C along a cross-section of the engine. In general, the upper junction 38 extends into the mast 12, in the case of a power plant without a wing, to reinforce the connection between the engine and the remainder of the aircraft.

Each junction comprises a first surface called a left surface 44 and a second surface called a right surface 46.

According to the prior art, these junctions 38 offer surfaces 44 and 46 that are approximately flat and are sized based on mechanical and aerodynamic stresses so as not to be detrimental to the performance levels of the propulsion unit.

The noise that is emitted by the propulsion unit 10 consists of, on the one hand, jet noise, produced outside of the pipes subsequent to the mixing of various flows of air and burnt gases, and, on the other hand, noise that is generated by the inside parts, so-called inside noise, produced by the fan, the compressors, the turbines, and the combustion that propagates inside the pipes.

Figure 2:
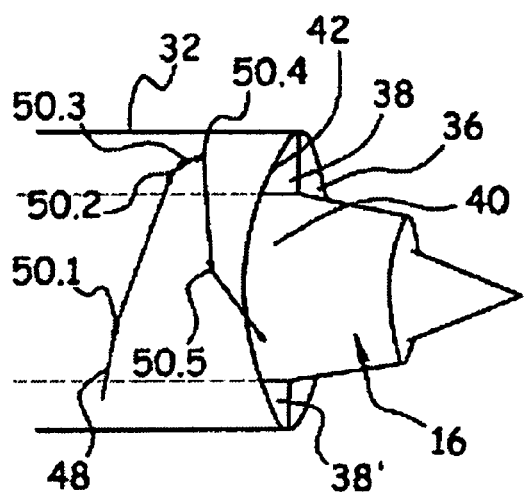
Figure 3:
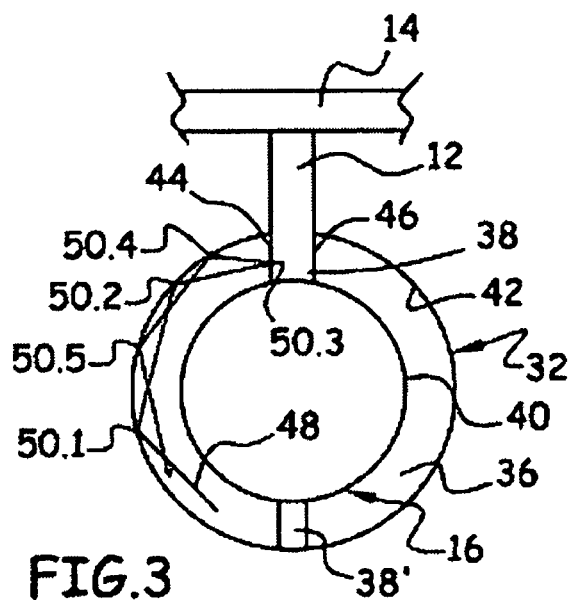

Regardless of the noise that is emitted at the source, the acoustic field is structured in the pipe in the form of a combination of "elementary sounds" called modes, whereby each mode propagates along the pipe according to preferred directions. Almost all of the modes propagate by rotating in the pipe, by reflecting on the inside and outside walls of the pipe that is being considered and on the walls of the junctions. By way of example, an acoustic beam 48 that is associated with a given mode that propagates in the secondary pipe 36 with two reflections 50.1 and 50.2 on the inside walls 40 and outside walls 42, a reflection 50.3 on the left surface 44 of the upper junction followed by two reflections 50.4 and 50.5 on the inside walls 40 and outside walls 42 before exiting from the pipe is shown in FIGS. 2 and 3.

To limit the impact of noise pollution close to airports, the international standards are increasingly restrictive as far as sound emissions are concerned.

Techniques have been developed to reduce internal noise, in particular by arranging, at walls of pipes and junctions, coatings whose purpose is to absorb a portion of the sound energy, in particular by using the principle of Helmholtz resonators.

The internal noise, however, which consists primarily of noise from the fan, a large portion of which propagates into the secondary pipe and radiates upon exiting the pipe, remains a predominant noise source, despite the use of acoustic coatings, in particular due to a limited number of reflections of the acoustic beams on said coatings.

Also, the purpose of this invention is to eliminate the drawbacks of the prior art by proposing a device that makes it possible to improve the effectiveness of the acoustic treatments in a pipe of an aircraft power plant.

For this purpose, the invention has as its object a device for improving the effectiveness of the acoustic treatment(s) in an aircraft propulsion unit that comprises a pipe into which a gas stream flows, whereby said pipe is delimited by two approximately concentric inside and outside walls, characterized in that it comprises at least one partition that extends over at least one portion of the length of the pipe between said inside and outside walls and in that the profile of at least one wall of said at least one partition is defined so as to increase the number of reflections of an acoustic beam on at least one of said inside and/or outside walls of said pipe and/or on at least one of said walls of said at least one partition.

This arrangement makes it possible to improve the effectiveness of the acoustic treatment and to obtain better attenuation of sound along the pipe.

Figure 4:
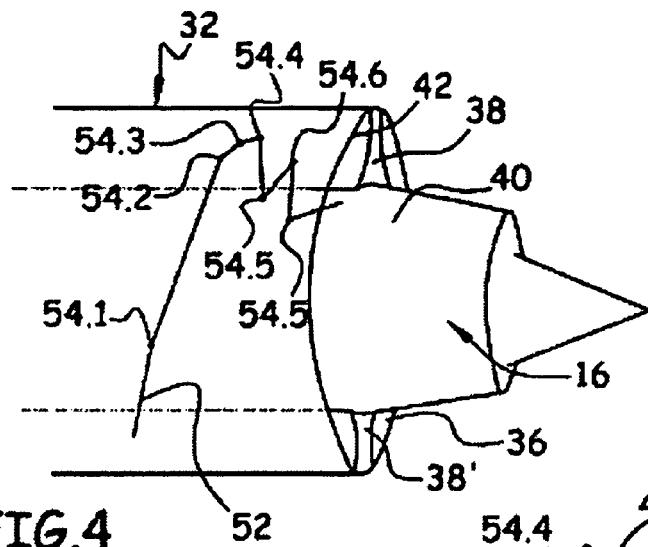
Figure 5:
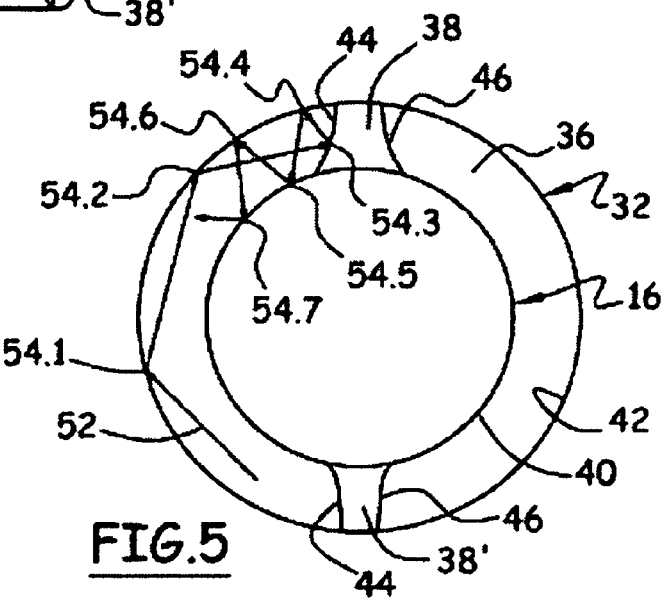
Figure 6A:
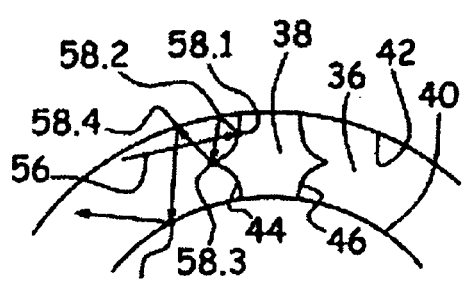
Figure 6B:
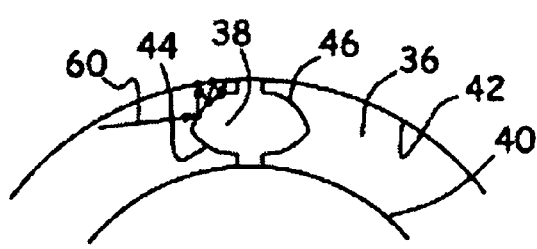

Other characteristics and advantages will emerge from the following description of the invention, a description that is provided only by way of example, with regard to the accompanying drawings, in which:

FIG. 1 is a longitudinal cutaway along a vertical plane of a propulsion unit,

FIG. 2 is a perspective rear view of a propulsion unit that illustrates the path of an acoustic beam with junctions according to the prior art, FIG. 3 is a rear view of a propulsion unit that illustrates the path of an acoustic beam with junctions according to the prior art, FIG. 4 is a perspective rear view of a propulsion unit that illustrates the path of an acoustic beam with junctions according to the invention, FIG. 5 is a rear view of a propulsion unit that illustrates the path of an acoustic beam with junctions according to the invention, FIG. 6A is a rear view illustrating a junction according to a variant of the invention, and FIG. 6B is a rear view illustrating a junction according to another variant of the invention.

In FIG. 1, an aircraft propulsion unit, also called a turbojet, connected to an aircraft using connecting means, in particular using a mast 12 under the wing 14 of the aircraft, is shown at 10.

The invention, however, is not limited to this implantation, whereby the propulsion unit can be connected to another part of the aircraft by means of different connecting means.

According to one embodiment, the propulsion unit 10 comprises, on the one hand, an engine 16 with, on the one hand, a fan that comprises a rotor 18 that is equipped with blades and a stator 20 that is equipped with paddles, and, on the other hand, a primary pipe 22 in which compressor stages 26, a combustion chamber 28, and turbine stages 30 are arranged according to the direction of flow of the air 24, more generally called gas stream. The engine 16 is arranged in a nacelle 32 that comprises an air intake 34 upstream from the fan and a secondary pipe 36 downstream from the stator 20 of the fan.

At least one crosspiece 38, also called junction, is provided to connect the engine and the nacelle, extending between the inside wall 40 and the outside wall 42 of the second pipe, whereby said crosspiece forms a partition in the secondary pipe 36 that is arranged in the direction of the air flow 24 and a radial direction.

According to one embodiment, the power plant comprises two radial crosspieces 38 and 38' that are arranged in a vertical plane, at angular positions that are respectively greater than 12 o'clock and less than 6 o'clock, whereby said crosspieces form two junctions, splitting the secondary pipe 36 into two parallel pipes in the shape of a C along a cross-section of the engine. In general, the upper junction 38 extends into the mast 12, in the case of a power plant without a wing, to reinforce the connection between the engine and the remainder of the aircraft.

Each junction comprises a first surface called a left surface 44 and a second surface called a right surface 46.

The arrangement of the junctions 38 may be different. Thus, the propulsion unit can comprise three junctions that are arranged at 120° or any other distribution of junctions.

The interaction of the flow of air with the fan produces a noise that is called fan noise that then propagates in the secondary exhaust pipe, but also in the air intake, and that then radiates in all directions upon exiting said pipe. The purpose of this invention is to improve the treatment of the fan noise. Nevertheless, it could be applied to other noises, such as, for example, the noise that originates from the combustion or that originates from the interaction of the flow with the stages of turbines or compressors.

Regardless of the noise that is emitted at the source, the acoustic field is structured in the pipe in the form of a combination of "elementary sounds" called modes, whereby each mode propagates along the pipe according to preferred directions. Almost all of the modes propagate by rotating in the pipe, by describing approximately helicoidal paths, by reflecting on the inside and outside walls of the pipe that is being considered, and on the walls of the junctions.

The purpose of the invention is more particularly to reduce the perception of the engine noise on the ground, including in particular the fan noise emitted by a propulsion unit that comprises at least one exhaust pipe. The combustion and turbine noises can also be targeted if at least one crosspiece is inserted into the corresponding pipe.

In general, the inside wall 40 and/or the outside wall 42 are covered at least partially by a coating whose purpose is to absorb a portion of the sound energy, in particular by using the principle of Helmholtz resonators. This coating is not presented in more detail because it is known to one skilled in the art.

According to the invention, at least one wall of at least one junction 38 has a profile that makes it possible to increase the number of reflections on at least one of the inside walls 40 or outside walls 42 of the secondary pipe 36 and/or on at least one of the very walls of the junction if the latter is treated, in particular if it comprises a coating whose purpose is to absorb a portion of the sound energy, so as to improve the effectiveness of the acoustic treatment(s).

In general, for the same junction, the left and right walls are approximately symmetrical. Nevertheless, the left and right walls can have a different profile and/or have an evolving profile over the length of the junction in the direction of the flow 24.

According to the variants, at least one of the walls of at least one junction, in particular the one in which at least one sound wave is reflected, comprises a coating whose purpose is to absorb a portion of the sound energy in the manner of the inside and outside walls of the secondary pipe. However, the walls of the junctions cannot comprise any coating whose purpose is to absorb a portion of the sound energy.

Below, to simplify the description, the left and right walls of the junctions are approximately symmetrical.

According to a first variant illustrated in FIGS. 4, 5 and 6A, the profile of the walls is defined so as to increase the number of reflections on the wall(s) 40 and/or 42 of the secondary pipe 36, in particular at zones comprising an acoustic coating, after at least one reflection on said junction. To the extent that the effectiveness of the acoustic treatment increases with the number of reflections, the device of the invention makes it possible to improve the effectiveness of the acoustic treatment and to obtain better attenuation of sound along the pipe.

Preferably, according to this configuration, the profile of the walls is concave or comprises at least one concave curved portion.

By way of example, an acoustic beam 52 that is associated with a given mode that propagates in the secondary pipe 36 with two reflections 54.1 and 54.2 on the inside walls 40 and outside walls 42, a reflection 54.3 on the left surface 44 of the upper junction followed by multiple reflections 54.4, 54.5, 54.6 and 54.7 on the inside walls 40 and outside walls 42 before exiting from the pipe is shown in FIGS. 4 and 5.

In FIG. 6A, another configuration in which an acoustic beam 56 is reflected twice on the junction 38 is shown. Thus, the acoustic beam 56 propagates in the secondary pipe 36 with a first reflection 58.1 on the junction, followed by a reflection 58.2 on one of the walls of the secondary pipe 36 and a second reflection 58.3 on the junction, then multiple reflections 58.4, 58.5 on the inside walls 40 and outside walls 42 before exiting the pipe.

According to another variant illustrated in FIG. 6B, the profile of the walls is defined so as to trap the acoustic energy by multiple reflections between the junction and one of the inside or outside walls of the secondary pipe. This configuration is all the more effective since the wall of the secondary pipe and/or the junction comprises a coating whose purpose is to absorb a portion of the sound energy at the right of the reflection zones.

Preferably, according to this configuration, the profile of the walls is convex or comprises at least one convex curved portion.

By way of example, an acoustic beam 60 that is associated with a given mode that propagates in the secondary pipe 36 with alternate reflections on the junction and on one of the walls of the secondary pipe is shown in FIG. 6B.

The profile of the junction could comprise at least one concave portion and/or at least one convex portion.

In all of the cases, the invention has a very light footprint, not even exacting a penalty in terms of mass, contrary to the devices of the prior art that induce an increase in the mass of the aircraft, to the extent where an already existing element is used.

According to an alternative, it could be possible to add partitions that extend into planes that may or may not be radial, at least in part over the length of the secondary pipe, making it possible to increase the reflections over at least one of the walls of said pipe so as to obtain better noise attenuation without said partitions ensuring a structural function in the manner of junctions 38.

As a variant, the invention can be applied in the primary pipe.

Finally, to the extent where the geometry of the most suitable junction depends on the propagation direction of the acoustic field in the pipe and therefore modes that compose this field, the geometry of the junction can be defined for treating certain modes in particular, the most dominant ones, in particular those that constitute the so-called stripe noise, at the pass frequency of the rotating parts and their harmonics.

The invention claimed is:

1. An aircraft nacelle comprising:
a pipe (22, 36) into which a gas stream flows, whereby said pipe (22, 36) is delimited by two approximately concentric inside walls (40) and outside walls (42), covered at least partially by a coating whose purpose is to absorb a portion of sound energy,
wherein at least one partition (38, 38') extends over at least one portion of a length of the pipe (22, 36) between said inside and outside walls (40, 42) and a profile of each of two walls (44, 46) of said at least one partition (38, 38') comprises a convex portion, and on each side of said convex portion a concave portion oriented towards the inside wall of the pipe and a concave portion oriented towards the outside wall of the pipe to increase the number of reflections of an acoustic beam on the coating to absorb a portion of the sound energy.

2. The aircraft nacelle according to claim 1, wherein the two walls (44, 46) of the partition or the at least one junction (38, 38') comprises an acoustic coating whose purpose is to absorb a portion of the sound energy.

3. The aircraft that comprises a nacelle according to claim 1.

4. The aircraft nacelle according to claim 1, wherein each of the two walls are opposite each other in a vertical axis of said at least one junction.

5. An aircraft nacelle comprising:
a secondary pipe (36), into which a gas stream flows, whereby said pipe (36) is delimited by two approximately concentric inside walls (40) and outside walls (42), covered at least partially by a coating whose purpose is to absorb a portion of sound energy, and, at least one junction (38, 38') that extends in a radial plane over at least a portion of a length of said pipe (36), wherein a profile of each of two walls (44, 46) of said at least one junction (38, 38') comprises a convex portion, and on each side of said convex portion a concave portion oriented towards the inside wall of the pipe and a concave portion oriented towards the outside wall of the pipe to increase the number of reflections of an acoustic beam on the coating to absorb a portion of the sound energy.

6. The aircraft nacelle according to claim 5, wherein the two walls (44, 46) of a partition or the junction (38, 38') comprises an acoustic coating whose purpose is to absorb a portion of the sound energy.

7. The aircraft that comprises a nacelle according to claim 5.

8. The aircraft nacelle according to claim 5, wherein the each of the two walls are opposite each other in a vertical axis of said at least one junction.

* * * * *